United States Patent
Ceccarani et al.

(10) Patent No.: US 6,651,490 B1
(45) Date of Patent: Nov. 25, 2003

(54) PROCESS FOR DETECTING A MISFIRE IN AN INTERNAL COMBUSTION ENGINE AND SYSTEM FOR CARRYING OUT SAID PROCESS

(75) Inventors: Massimo Ceccarani, Bologna (IT); Corrado Rebottini, Crevalcore (IT); Riccardo Bettini, Castello D'Argile (IT); Piero Campi, Castelnuovo Rangone (IT)

(73) Assignee: Automobili Lamborghini S.p.A., Bologna (IT)

( * ) Notice: Subject to any disclaimer, the term of this patent is extended or adjusted under 35 U.S.C. 154(b) by 0 days.

(21) Appl. No.: 09/601,427

(22) PCT Filed: Aug. 17, 1998

(86) PCT No.: PCT/IT98/00233

§ 371 (c)(1),
(2), (4) Date: Aug. 28, 2000

(87) PCT Pub. No.: WO99/44028

PCT Pub. Date: Sep. 2, 1999

(30) Foreign Application Priority Data

Feb. 24, 1998 (IT) .......................................... MI98A0363

(51) Int. Cl.[7] ............................................. G01M 15/00
(52) U.S. Cl. ....................................................... 73/117.3
(58) Field of Search ................................ 73/116, 117.2, 73/117.3, 118.1; 340/438, 439, 441; 701/99, 101, 102, 110, 111

(56) References Cited

U.S. PATENT DOCUMENTS

| | | | |
|---|---|---|---|
| 4,083,234 A | * 4/1978 | Aono et al. .................... | 73/116 |
| 4,189,940 A | 2/1980 | Hulls et al. | |
| 4,302,814 A | 11/1981 | Full et al. | |
| 4,424,709 A | * 1/1984 | Meier et al. ................ | 73/117.3 |
| 5,109,825 A | 5/1992 | Joos et al. | |
| 5,193,513 A | * 3/1993 | Marko et al. ............... | 73/117.3 |
| 5,278,760 A | 1/1994 | Ribbens et al. | |
| 5,345,817 A | 9/1994 | Grenn et al. | |
| 5,369,989 A | * 12/1994 | Gates, Jr. et al. .............. | 73/115 |
| 5,415,036 A | * 5/1995 | Park .......................... | 73/117.3 |
| 5,528,930 A | * 6/1996 | Park .......................... | 73/117.3 |
| 5,559,285 A | * 9/1996 | Bryant et al. ............... | 73/117.3 |
| 5,576,963 A | 11/1996 | Ribbens et al. | |
| 5,848,372 A | * 12/1998 | Ito et al. ...................... | 73/117.3 |
| 5,935,189 A | * 8/1999 | Park .......................... | 73/117.3 |
| 6,243,641 B1 | * 6/2001 | Andrews et al. ........... | 73/117.3 |

FOREIGN PATENT DOCUMENTS

| | | |
|---|---|---|
| DE | 44 12 191 | 10/1994 |
| EP | 0 222 486 | 5/1987 |

* cited by examiner

*Primary Examiner*—Eric S. McCall
(74) *Attorney, Agent, or Firm*—Merchant & Gould, P.C.

(57) ABSTRACT

A process for detecting a misfire in one or more cylinders of an internal combustion engine, including sampling the exhaust gas pressure values during at least one engine cycle at a sampling frequency proportional to the crankshaft rotational speed, analyzing the sampled signal in the frequency domain, calculating a misfire index from the analysis, comparing the index with one or more threshold values, and identifying a misfire based on the comparison of the index with the threshold values.

14 Claims, 7 Drawing Sheets

PROCESS FOR DETECTING A MISFIRE IN AN INTERNAL COMBUSTION ENGINE AND SYSTEM FOR CARRYING OUT SAID PROCESS

The present invention relates to a process for detecting a misfire in an internal combustion engine, and in particular a process which can be used for detecting a misfire in one or more cylinders of an internal combustion engine. The present invention also relates to a system for carrying out said process.

It is known that in order to monitor the performance of an internal combustion engine, in particular a racing engine with a high number of cylinders, it is desirable to detect the occurrence of the misfire of the fuel mixture in one or more cylinders. A process for carrying out said detection, which is known from U.S. Pat. No. 5,576,936 and presently plays an important role with respect to the ever stricter rules for the control of polluting exhausts, consists of measuring the sudden fluctuations in the rotational speed of the crankshaft by means of an electronic sensor located close to the fly-wheel. This sensor is connected to the control unit positioned inside the car, which receives all the data concerning the engine and transmitted by suitable sensors. By calculating the fluctuations in the speed according to the delivered torque it is possible to identify a possible misfire in one cylinder of the engine. However, this process does not allow to precisely identify in which cylinder the misfire occurred and moreover has a quite high error probability, particularly in the case of the traveling car being subjected to sharp oscillations, e.g. caused by defects in the road surface, which temporarily affect the rotational speed of the crankshaft.

In order to overcome these drawbacks, U.S. Pat. No. 5,109,825 devised to measure the fluctuations in time of the pressure of the engine exhaust gas. Though pressure sensors available on the market are very accurate and provide a response almost in real time, the known processes for detecting the misfire on the basis of the measurement of the pressure fluctuations in the exhaust gas are still very inaccurate and poorly reliable, particularly when applied to engines with a high number of cylinders.

Therefore the object of the present invention is to provide a process for detecting the misfire which is free from the above-mentioned drawbacks. Another object of the present invention is to provide a system which carries out said process. These objects are achieved by means of a process and a system whose main characteristics are disclosed in the first and eighth claim respectively.

Thanks to the sampling and the subsequent frequency analysis of the pressure values detected in the exhaust pipes, the process according to the present invention provides a higher accuracy and reliability with respect to prior art processes. In fact, if the engine firing is regular, the periodical openings of the cylinder exhaust valves generate pressure pulses in the exhaust pipes having the same periodicity and similar waveforms. On the contrary, in the case of misfire in one of the cylinders, the corresponding pressure pulse is changed, thus changing the periodical pattern of the pressure values. The reference for the synchronization with the pulse frequency is readily derivable from the sensors detecting the rotational speed of the crankshaft and/or camshaft.

Another advantage of the process according to the present invention is that through the frequency analysis of the sampled signal it is possible to determine whether only one or more misfires occurred during a single engine cycle.

In fact, the amplitude of the modulus of the various harmonics of the sampled signal depends on the number of cylinders wherein the misfire occurred.

A further advantage of the process according to the present invention is that through the frequency analysis of the sampled signal it is possible to determine not only the misfire, but also the position of the cylinder where it occurred. In fact, the knowledge of the cylinder firing sequence and the comparison of the phase of the first harmonic of the sampled signal with the phase of the first cylinder provide a phase difference which indicates the position of the cylinder where the misfire occurred.

These and other advantages and characteristics of the process and system according to the present invention will be clear to those skilled in the art from the following detailed description of an embodiment thereof, with reference to the annexed drawings wherein:

FIG. 6 shows a Fourier transform of the diagram of FIG. 3a; and

Figure 1:
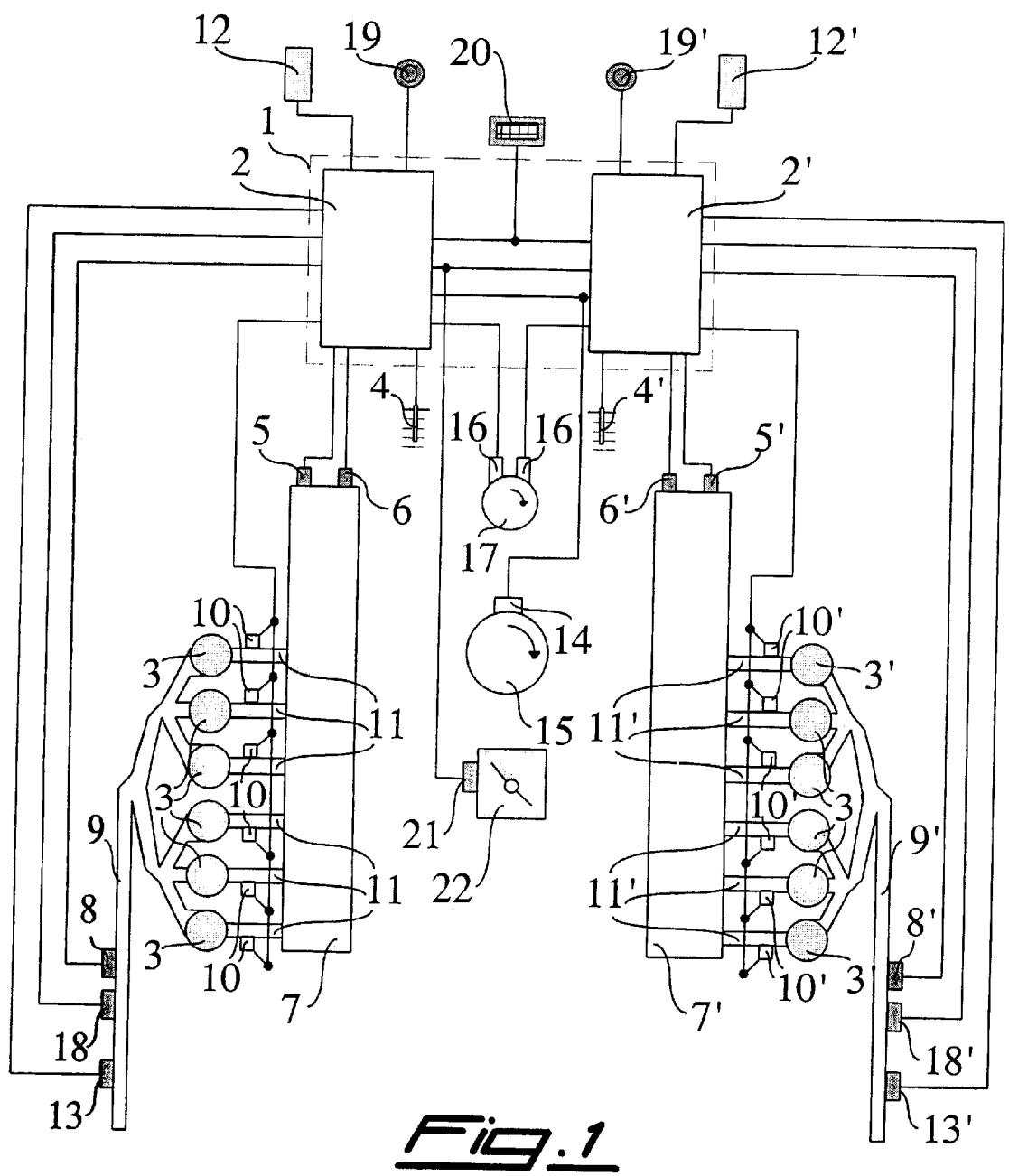
FIG. 1 shows a diagrammatic view of the system according to the present invention.

With reference to FIG. 1, there is seen that the system according to the present invention includes in a known manner a control unit 1 (indicated by a dotted line) which in turn includes a pair of mutually connected electronic controllers 2, 2' each of which provides the control over one of two rows of cylinders 3, 3' of the engine. In the present embodiment there is described a V12 engine having two rows of six cylinders 3, 3' each, but in other embodiments the number of cylinders and/or rows may obviously change. The controllers 2, 2' are connected in a known manner to a pair of coolant temperature sensors 4, 4' and to two pairs of sensors 5, 5' and 6, 6' respectively detecting the temperature and pressure of the air in the intake manifolds 7, 7'. The controllers 2, 2' are also connected to a pair of lambda sensors 8, 8' for analyzing the oxygen content in the exhaust pipes 9, 9', to two series of injectors 10, 10' which inject the fuel into the intake pipes 11, 11' of the cylinders 3, 3', as well as to a pair of ignition coils 12, 12'. The exhaust pipes 9, 9' are preferably provided also with a pair of temperature sensors 13, 13' connected to the controllers 2, 2'.

The system according to the present embodiment of the invention suitably includes a sensor 14 detecting the rotational speed of the fly-wheel 15 integral with the crankshaft and a further pair of sensors 16, 16' detecting the rotation of the camshaft 17. These sensors 14, 16 and 16' are connected to the controllers 2, 2' so that the latter, on the basis of the received data, can calculate in real time the speed and angle of rotation of the crankshaft during an engine cycle. The presence of the sensors 14, 16 and 16' is made necessary by the fact that the fly-wheel 15 in a four-stroke engine makes two revolutions (720°) per cycle, whereby the reference provided by the sensors 16, 16' allows to distinguish the first revolution from the second one.

In order to carry out the process according to the present invention, in the two exhaust pipes 9, 9' there are properly arranged two high-precision pressure sensors 18, 18' connected to the controllers 2, 2', said sensors transmitting in real time an electric signal whose voltage is proportional to the measured pressure. Furthermore, the controllers 2, 2' are connected to a pair of warning lights 19, 19' positioned inside the car, to a port 20 for the connection to an external processor, as well as to a sensor 21 detecting the position of the engine throttle 22.

Figure 2:
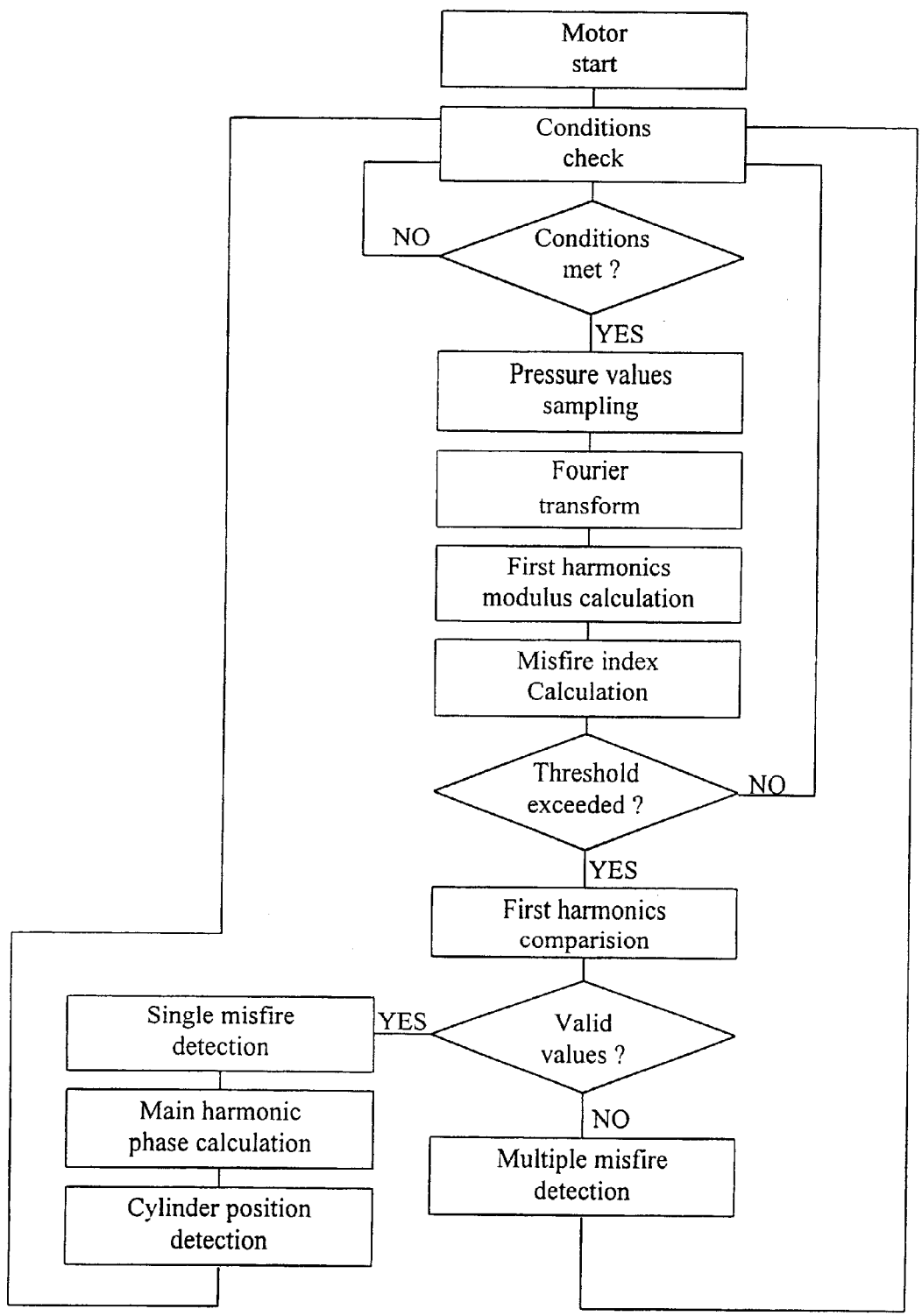
FIG. 2 shows a flow chart of the process according to the present invention.

Referring now to FIG. 2, there is seen that the process according to the present invention includes, after a certain period of time from the engine start, a first step of periodical check, e.g. each second, of the engine running state. In fact, in order to obtain reliable results from the process, it is preferable that the latter be carried out only if some engine parameters are within a preset range of values. In particular, the process according to the present invention is activated only when the coolant temperature measured by sensors 4, 4', the air temperature measured by sensors 5, 5' and the air pressure measured by sensors 6, 6' in the manifolds 7, 7' are above certain thresholds stored in the memory of the controllers 2, 2'. Moreover, these controllers check that the revolutions per minute (rpm) detected by sensor 14 are within a preset range of values.

Table 1 hereunder shows an example of values meeting the conditions for the start of the process.

TABLE 1 start conditions

| | |
|---|---|
| Minimum number of revolutious | 990 rpm |
| Maximum number of revolutions | 7550 rpm |
| State check period | 1 s |
| Delay from engine start | 10 s |
| Minimum coolant temperature | 20° C. |
| Minimum air temperature | 20° C. |
| Minimum absolute pressure in manifolds 7, 7' | 250 mmHg |

A further condition for starting the process may be reaching a certain opening of the throttle 22 as detected by sensor 21.

If the conditions above are met, at the beginning of an engine cycle, corresponding to a certain position of the camshaft 17 as detected by sensors 16, 16', the controllers 2, 2' start sampling the electric signals transmitted by sensors 18, 18' and proportional to the pressure inside the exhaust pipes 9, 9'. These analogue signals are converted in a known manner into digital form and then stored in a buffer memory within each controller 2, 2'. The sampling frequency is suitably synchronized with the rotational speed of the flywheel 15 as detected by sensor 14, so that at the end of the engine cycle, detected through sensors 16 and 16', there is stored a preset number, e.g. 64, of pressure samples. Though the response of the pressure sensors 18, 18' is almost immediate, in order to synchronize precisely with the engine, the controllers 2, 2' take into account the lag, almost constant, caused by the time required by the pressure pulse to travel from the exhaust valves of the cylinders 3, 3' to the pressure sensors 18, 18' along the exhaust pipes 9, 9'. Thanks to the temperature sensors 13, 13' it is possible to compensate for the very small fluctuations in said lag caused by the fluctuations in the temperature within the pipes 9, 9'.

After having been sampled, the pressure values corresponding to an engine cycle are processed by the controllers 2, 2' which, at the same time, sample another series of pressure values which are stored in a further buffer memory for a subsequent processing.

This processing carried out by each processor of the controllers 2, 2' suitably includes an analysis in the frequency domain, and in particular a Fourier transform of the sampled signal, through which there are obtained two series of coefficients corresponding to the real part and the imaginary part of the first harmonics of the signal. In particular, in the present embodiment there are calculated the coefficients of the first 32 harmonics of the sampled signal, but in other embodiments it is obviously possible to calculate a different number of harmonics according to the needs.

These coefficients are used to calculate in a known way the modulus of the first harmonics, e.g. the first three, and then, by combining the values of these moduli, to obtain an index which allows to detect a misfire in one or more of the cylinders 3, 3'. This misfire index can be calculated in various ways, e.g. by adding or multiplying the moduli of the harmonics. Prior to this addition or multiplication, the moduli may possibly be multiplied or raised to a power with a different coefficient for each harmonic, so as to obtain a weighed addition or multiplication. In the present embodiment, the misfire index is calculated by simply adding the moduli of the first three harmonics.

Once said index has been calculated, it is compared with preset threshold values stored in the controllers 2, 2'. Table 2 hereunder shows an example of threshold values of the misfire index experimentally obtained as a function of the engine rpm detected by sensor 14 and of the pressure in the manifolds 7, 7' as detected by sensors 6, 6'.

TABLE 2

Threshold values of the misfire index

| | rpm ↓ | | | | | | | |
|---|---|---|---|---|---|---|---|---|
| mmHg ↓ | 1100 | 2000 | 3000 | 4000 | 5000 | 6000 | 7000 | 7500 |
| 300 | 110 | 110 | 124 | 130 | 144 | 148 | 156 | 168 |
| 450 | 115 | 120 | 148 | 156 | 180 | 188 | 196 | 204 |
| 600 | 130 | 140 | 180 | 188 | 236 | 248 | 256 | 268 |
| 760 | 150 | 162 | 224 | 264 | 292 | 300 | 312 | 320 |

The controller 2 or 2' which detects the exceeding of said threshold, indicates through the warning light 19 or 19' that a misfire occurred in the corresponding row of cylinders 3 or 3'.

At this moment, the controller 2 or 2' which detected the misfire preferably compares the modulus of each of the first three harmonics with preset threshold values also stored as a function of the engine rpm and of the pressure in the corresponding manifold 7 or 7'. If all three moduli are within a range of values between a minimum threshold and a maximum threshold, a single misfire is detected, i.e. a misfire occurred in one only of the cylinders 3 or 3', otherwise a multiple misfire is detected, i.e. a misfire occurred in at least two of the cylinders 3 or 3' belonging to a row.

The following tables 3.1, 3.2, 4.1, 4.2, 5.1 and 5.2 show examples of minimum values and amplitudes of the threshold ranges for the moduli of the first three harmonics.

TABLE 3.1

Minimum threshold values for the modulus of the first harmonic

| | rpm ↓ | | | | | | | |
|---|---|---|---|---|---|---|---|---|
| mmHg ↓ | 1100 | 2000 | 3000 | 4000 | 5000 | 6000 | 7000 | 7500 |
| 300 | 8 | 28 | 48 | 40 | 56 | 84 | 84 | 84 |
| 450 | 8 | 24 | 56 | 40 | 80 | 96 | 96 | 96 |
| 600 | 12 | 36 | 60 | 72 | 116 | 104 | 104 | 104 |
| 760 | 24 | 44 | 72 | 108 | 160 | 144 | 144 | 144 |

TABLE 3.2

Range amplitude for the modulus of the first harmonic

| mmHg ↓ | rpm ↓ | | | | | | | |
|---|---|---|---|---|---|---|---|---|
| | 1100 | 2000 | 3000 | 4000 | 5000 | 6000 | 7000 | 7500 |
| 300 | 128 | 108 | 92 | 180 | 144 | 188 | 192 | 196 |
| 450 | 120 | 140 | 148 | 184 | 168 | 192 | 196 | 200 |
| 600 | 96 | 128 | 176 | 144 | 192 | 200 | 224 | 244 |
| 760 | 68 | 144 | 196 | 188 | 244 | 224 | 228 | 232 |

TABLE 4.1

Minimum threshold values for the modulus of the second harmonic

| mmHg ↓ | rpm ↓ | | | | | | | |
|---|---|---|---|---|---|---|---|---|
| | 1100 | 2000 | 3000 | 4000 | 5000 | 6000 | 7000 | 7500 |
| 300 | 20 | 8 | 8 | 4 | 12 | 16 | 24 | 28 |
| 450 | 24 | 12 | 8 | 8 | 16 | 16 | 28 | 36 |
| 600 | 20 | 12 | 8 | 16 | 24 | 16 | 24 | 32 |
| 760 | 24 | 16 | 8 | 28 | 40 | 36 | 36 | 36 |

TABLE 4.2

Range amplitude for the modulus of the second harmonic

| mmHg ↓ | rpm ↓ | | | | | | | |
|---|---|---|---|---|---|---|---|---|
| | 1100 | 2000 | 3000 | 4000 | 5000 | 6000 | 7000 | 7500 |
| 300 | 48 | 64 | 72 | 96 | 80 | 72 | 56 | 52 |
| 450 | 48 | 80 | 112 | 92 | 104 | 68 | 52 | 48 |
| 600 | 72 | 108 | 140 | 124 | 136 | 96 | 80 | 60 |
| 760 | 96 | 124 | 172 | 168 | 160 | 136 | 88 | 72 |

TABLE 5.1

Minimum theshold values for the modulus of the third harmonic

| mmHg ↓ | rpm ↓ | | | | | | | |
|---|---|---|---|---|---|---|---|---|
| | 1100 | 2000 | 3000 | 4000 | 5000 | 6000 | 7000 | 7500 |
| 300 | 0 | 0 | 0 | 0 | 0 | 0 | 0 | 0 |
| 450 | 0 | 0 | 0 | 0 | 0 | 0 | 0 | 0 |
| 600 | 8 | 4 | 4 | 4 | 8 | 4 | 0 | 0 |
| 760 | 4 | 4 | 4 | 12 | 12 | 8 | 4 | 4 |

TABLE 5.2

Range amplitude for the modulus of the third harmonic

| mmHg ↓ | rpm ↓ | | | | | | | |
|---|---|---|---|---|---|---|---|---|
| | 1100 | 2000 | 3000 | 4000 | 5000 | 6000 | 7000 | 7500 |
| 300 | 92 | 72 | 52 | 124 | 40 | 132 | 144 | 152 |
| 450 | 92 | 88 | 84 | 88 | 64 | 84 | 64 | 60 |
| 600 | 88 | 104 | 112 | 68 | 96 | 48 | 28 | 24 |
| 760 | 88 | 124 | 160 | 136 | 160 | 80 | 80 | 80 |

If a misfire is detected in only one of the six cylinders 3 or 3', the relevant controller 2 or 2' can determine the position of the cylinder where the misfire occurred by first calculating in a known manner the phase of the first harmonic. Thereafter, by subtracting the phase of the first harmonic from the phase of the first cylinder of the engine cycle, stored in the controllers 2, 2' by means of a table as a function of the engine rpm, there is obtained a phase difference which approximately corresponds to the phase of the cylinder where the misfire occurred.

For example, if at given engine rpm the phase of the first cylinder of the engine cycle is 210°, a misfire occurred in the first, second, third, fourth, fifth or sixth cylinder in firing order when the phase of the first harmonic is respectively between 180° and 240°, 120° and 180°, 60° and 120°, 0° and 60°, 300° and 360° or 240° and 300°.

Table 6 hereunder shows the relationship between the engine rpm and the phase of the first cylinder in order to determine the position of the cylinder where the misfire occurred.

TABLE 6 relationship between engine rpm and phase of the first cylinder

| rpm | phase |
|---|---|
| 510 | 164° |
| 990 | 140° |
| 1500 | 106° |
| 2010 | 80° |
| 2490 | 58° |
| 3000 | 36° |
| 3510 | 16° |
| 3990 | 0° |
| 3990 | 360° |
| 4500 | 348° |
| 5010 | 338° |
| 5490 | 328° |
| 6000 | 320° |
| 6510 | 312° |
| 6990 | 302° |
| 7500 | 292° |

Each detection of a misfire in one of the engine cylinders, as well as the corresponding cylinder position in case of single misfire, is stored in suitable counters in the memory of controllers 2, 2'. This memory can be read through port 20 by an external processor during the car servicing, so as to diagnose possible engine failures.

Figure 3A:
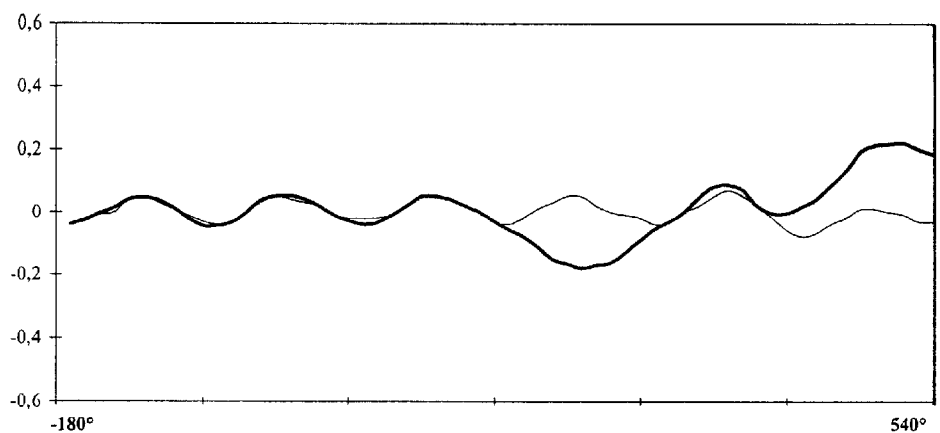
FIGS. 3a, 3b and 3c show three diagrams of the pressure as a function of the crankshaft rotation.
Figure 3B:
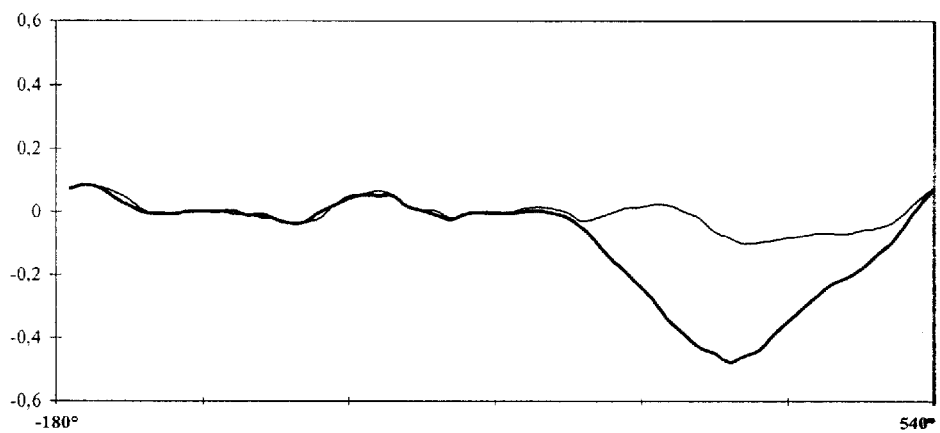
Figure 3C:
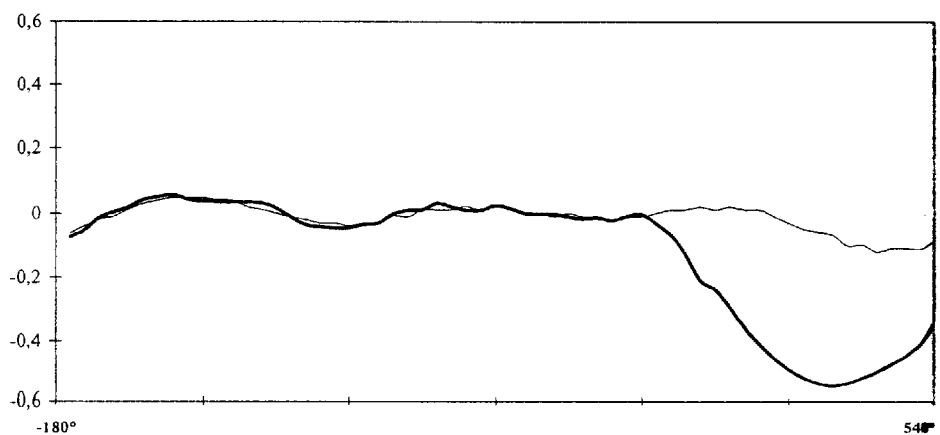

Referring now to FIGS. 3a to 3c, there is seen, through measurements made in experimental tests where misfires were caused in the tested engine, how the signal transmitted by sensors 18, 18' changes as a function of the misfire in one of the cylinders 3, 3'. In particular, FIG. 3a shows that at about 2000 rpm with an engine load around 15%, the voltage (given in Volts) at the terminals of the pressure sensors 18, 18' proportional to the pressure in the exhaust pipes 9, 9' is almost regular with six periodical oscillations during an engine cycle (indicated by the crankshaft rotation angle from −180° to 540°). This voltage is indicated by a thin line, whereas a thick line indicates the voltage in the case of misfire in the first cylinder. In this case, it is clearly seen that the voltage pattern has a first irregularity around 240° and a second irregularity around 480°. However, FIG. 3b shows that at about 4000 rpm with an engine load approximately at 100%, the voltage pattern in case of regular firing is more complicated with respect to the preceding case. Nonetheless, the voltage pattern in case of misfire in the first cylinder (still indicated by the thick line) moves away around 400° from the regular firing voltage pattern (still indicated by the thin line). Also FIG. 3c shows that at about 6000 rpm with an engine load approximately at 100%, the voltage pattern of the pressure sensors 18, 18' is different in the case of misfire in the first cylinder, in particular around 470°.

Figure 4A:
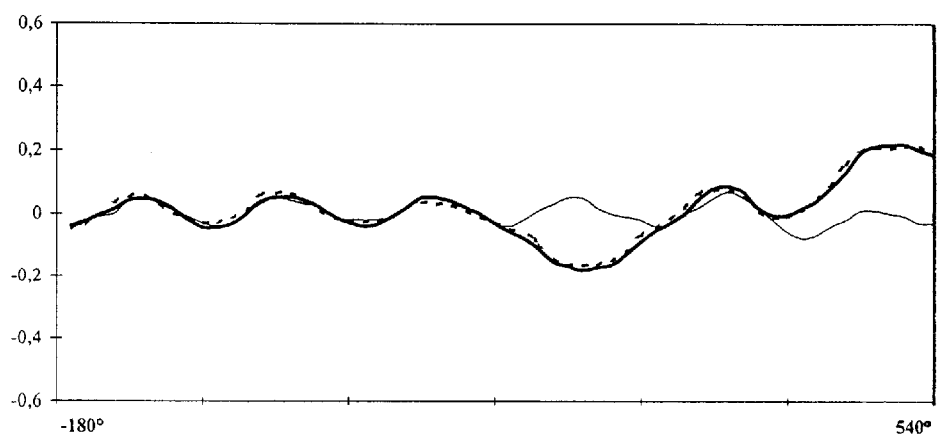
FIGS. 4a, 4b and 4c show other three diagrams of the pressure as a function of the crankshaft rotation.
Figure 4B:
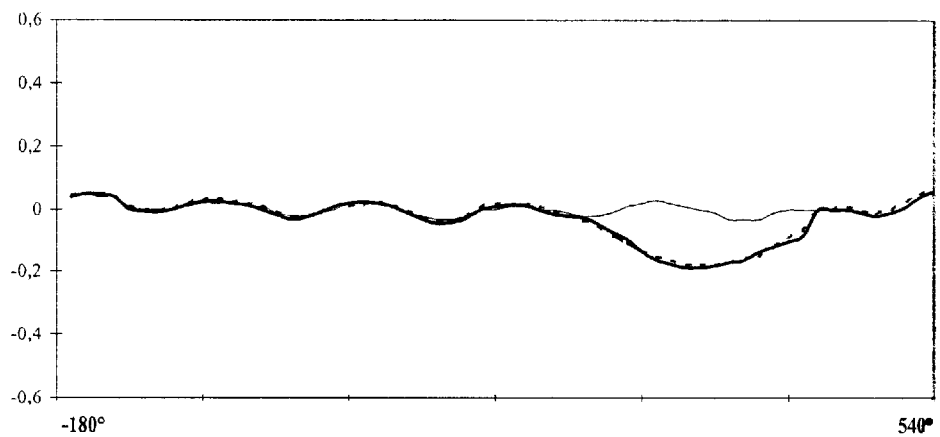
Figure 4C:
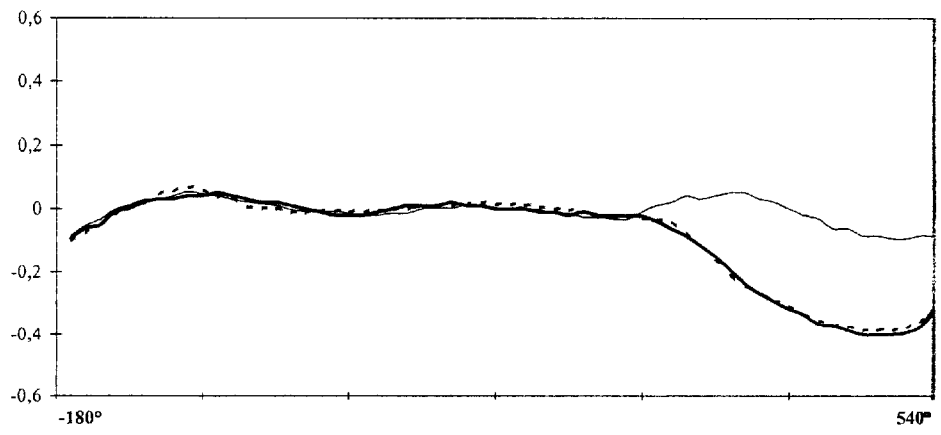

Similarly, with reference to FIGS. 4a to 4c, there is seen, still through measurements made in experimental tests, how the signal transmitted by the pressure sensors 18, 18' changes as a function of the misfire in one of the cylinders 3, 3', regardless of the misfire being caused by a lack of fuel injection or ignition in the cylinder. In fact, there is seen that the voltage pattern in case of lack of injection (indicated by the thick line) is substantially equal to the voltage pattern in case of lack of ignition (indicated by the dotted line). This correspondence can be found both at low rpm, i.e. at about 2000 rpm with an engine load around 15% (FIG. 4a), at intermediate rpm, i.e. at about 4000 rpm with an engine load around 55% (FIG. 4b), and at high rpm, i.e. at about 6000 rpm with an engine load approximately at 100% (FIG. 4c).

Figure 5A:
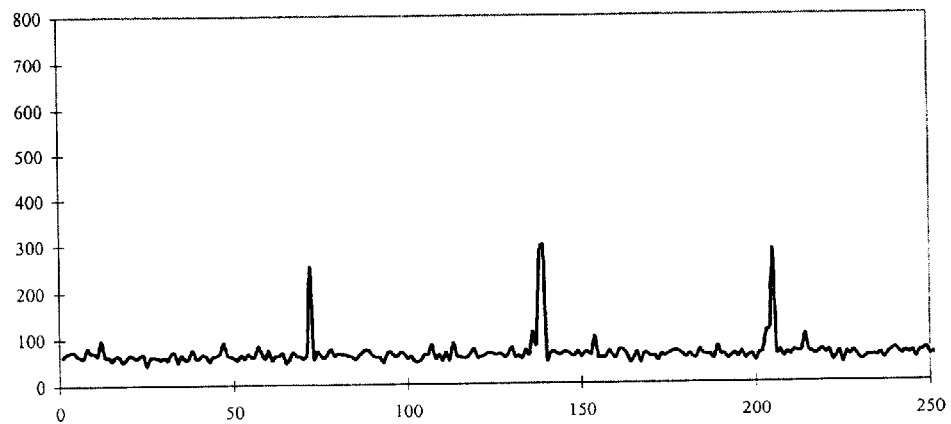
FIGS. 5a, 5b and 5c show three diagrams of the misfire index as a function of the number of engine cycles.
Figure 5B:
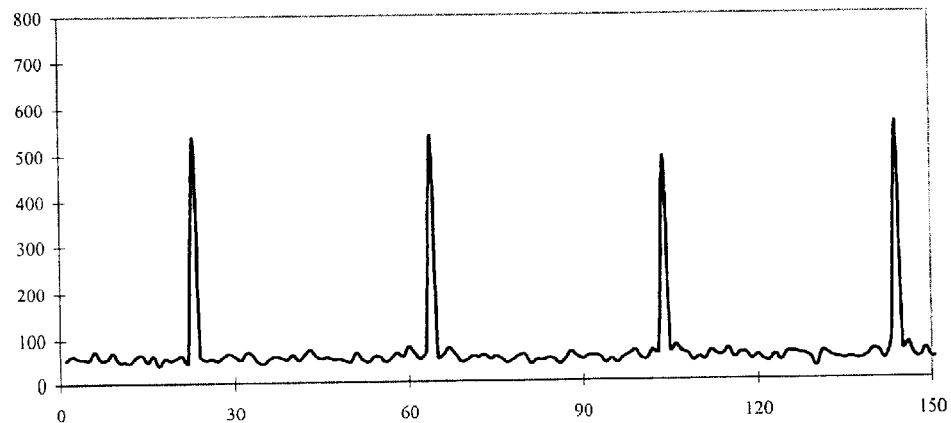
Figure 5C:
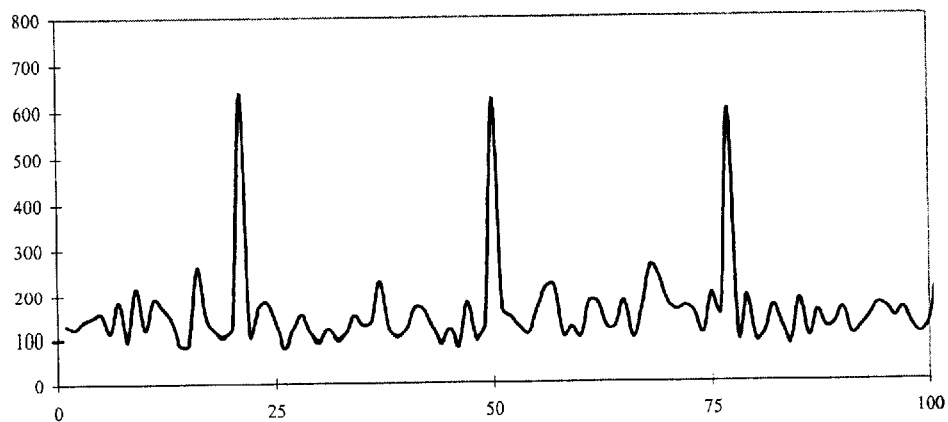

Referring now to FIGS. 5a to 5c, there is seen that the misfire index measured as a function on the engine cycles (indicated on the horizontal axis) shows readily detectable peaks, which correspond to the moments when a misfire was experimentally caused in one of the engine cylinders. This can be found both at low rpm, i.e. at about 1000 rpm with an engine load around 15% (FIG. 5a), at intermediate rpm, i.e. at about 3000 rpm with an engine load around 55% (FIG. 5b), and at high rpm, i.e. at about 5000 rpm with an engine load approximately at 100% (FIG. 5c).

Figure 6:
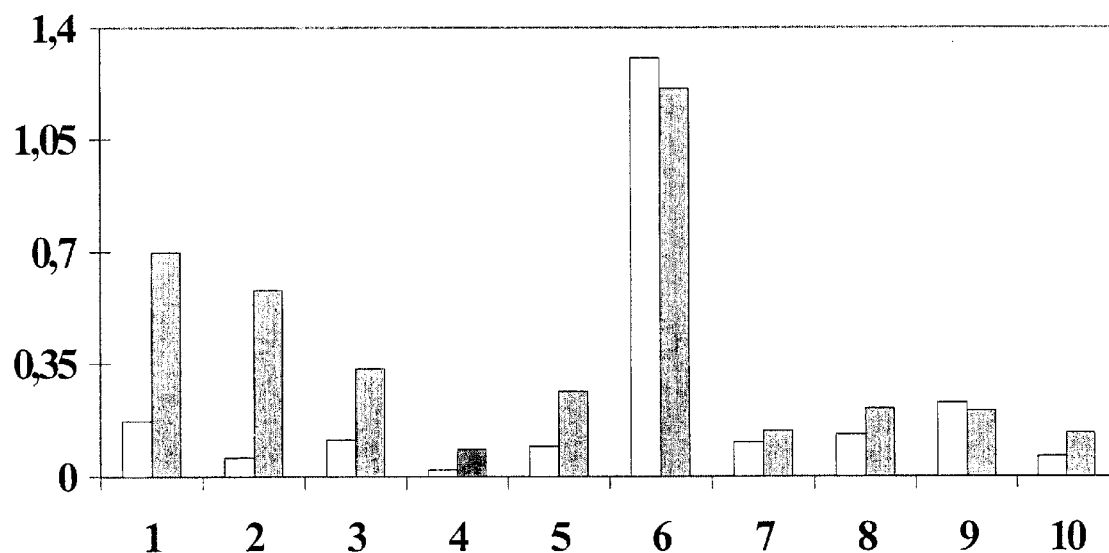

With reference to FIG. 6, there is seen that the modulus of the first ten harmonics of the signal (in Volts) transmitted by sensors 18, 18' changes quite apparently from the case of regular firing in all cylinders (indicated by the white bars) to the case of misfire in the first cylinder (indicated by the grey bars). The figure shows the modulus of the first ten harmonics calculated with the engine at 2000 rpm and a load around 15%, i.e. the case shown in FIG. 3a and FIG. 4a. The figure clearly shows that in the case of regular firing the modulus of the sixth harmonic is much higher than all other moduli, whereas in the case of misfire in the first cylinder there is also a significant contribution of the moduli of the first harmonics, in particular of the first three. It is clear that the contribution of the modulus of each harmonic depends on some factors which have to be considered when setting the threshold values of the misfire index. These factors include, for example, the shape of the exhaust pipes 9, 9', the number and the firing sequence of the cylinders 3, 3' of each row.

Figure 7A:
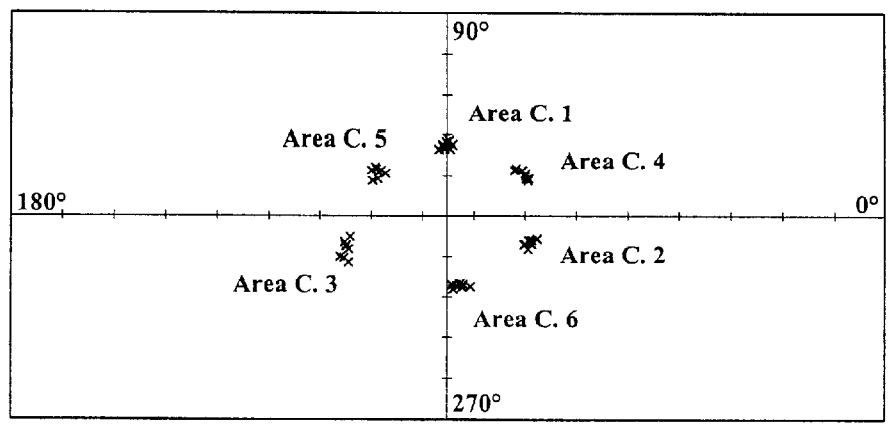
FIGS. 7a, 7b and 7c show three diagrams in polar coordinates of the main harmonic of the pressure in the diagrams of FIGS. 3a, 3b and 3c.
Figure 7B:
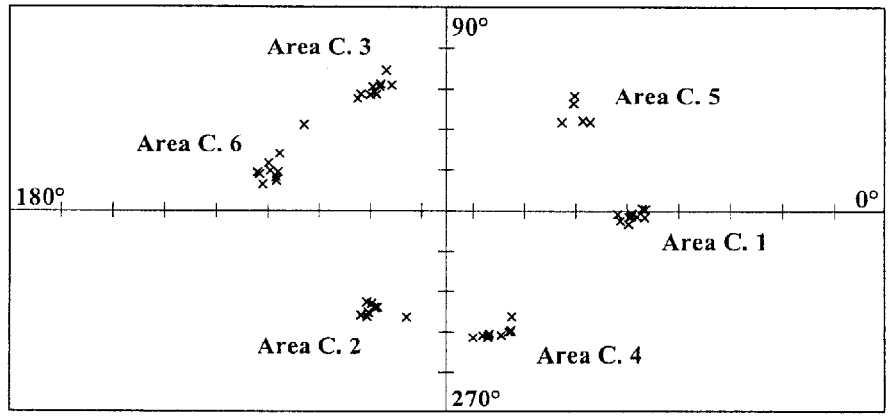
Figure 7C:
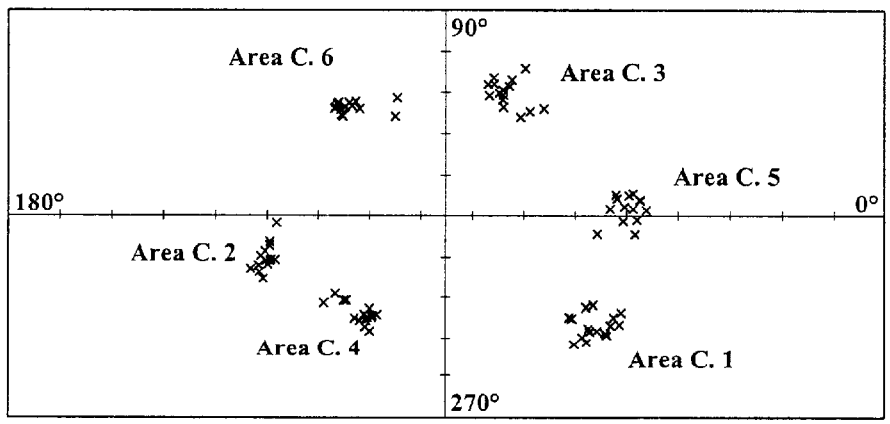

Finally referring to FIGS. 7a to 7c, there is seen that the phase of the first harmonic changes as a function of the position of the cylinder where the misfire occurred. In fact, it is possible to identify six separate areas, each area corresponding to an engine cylinder, where the polar coordinates of the modulus and phase of the first harmonic at the moment of the misfire are concentrated. In particular, there is seen that said coordinates concentrate in six sectors having an extension of 60° each, whose sequence is defined by the cylinder firing sequence, which in the present embodiment is 1-4-2-6-3-5 for the row of cylinders 3. Taking into account the engine phase, this correspondence can be found both at low rpm, i.e. at about 2000 rpm with an engine load approximately at 100% (FIG. 7b), and at high rpm, i.e. at about 6000 rpm with an engine load approximately at 100% (FIG. 7c).

Possible additions and/or modifications may be made by those skilled in the art to the above-described and illustrated embodiment, yet without departing from the scope of the invention. In fact it is obvious that the type of sampling, frequency analysis and particularly the method for calculating the misfire index may change according to the type of engine to be monitored. Similarly, also the threshold values may change according to the experimental tests carried out on each type of engine.

Finally, it is obvious that the process according to the present invention can be used in combination with one or more prior art processes.

What is claimed is:

1. A method for detecting a misfire in one or more cylinders of an internal combustion engine, comprising the steps of:
    generating a sampled signal by sampling an exhaust gas pressure during at least one engine cycle at a sampling frequency proportional to rotational speed of a crankshaft;
    analyzing said sampled signal in the frequency domain by means of a Fourier transform;
    calculating a misfire index from said analysis;
    comparing said index with at least one threshold value; and
    identifying a misfire based on said comparison of said index with said at least one threshold value.

2. A method according to claim 1, wherein said calculation of said index comprises combining at least some harmonic moduli of said sampled signal.

3. A method according to claim 1, wherein said calculation of said index comprises combining at least first, second, and third harmonic moduli of the sampled signal.

4. A method according to claim 1, wherein said sampling starts at a beginning of the engine cycle.

5. A method according to claim 1, further comprising the step of comparing at least one harmonic modulus of said sampled signal with at least one of said at least one threshold value.

6. A method according to claim 1, further comprising the steps of calculating a phase of a first harmonic of said sampled signal, and calculating a difference between said phase of said first harmonic and a phase of at least one engine cylinder.

7. An apparatus for detecting a misfire in one or more cylinders of an internal combustion engine, comprising:
    at least one sensor for detecting a pressure in an exhaust pipe;
    at least one sensor for detecting a rotation of a crankshaft;
    said sensors being connected to at least one control unit, said control unit comprising:
        means for producing a converted signal by performing analogue-to-digital conversion of a signal from said sensor for detecting exhaust pipe pressure;
        means for producing a sampled signal by sampling said converted signal, wherein a sampling frequency is proportional to a rotational speed of the crankshaft;
        memory means for storing said sampled signal; and
        means for analyzing said sampled signal in the frequency domain by means of a Fourier transform, calculating a misfire index from said analysis, comprising said index with at least one threshold value, and identifying a misfire based on said comparison of said index with said at least one threshold value.

8. An apparatus according to claim 7, further comprising at least one further sensor for detecting the rotation of the camshaft.

9. An apparatus according to claim 7, further comprising means for controlling the sampling frequency of said means for producing a sampling signal based on a signal transmitted by said sensor for detecting the rotation of the crankshaft.

10. An apparatus according to claim 7, further comprising at least one sensor for detecting a coolant temperature, at least one sensor for detecting a temperature of air in intake manifolds, and at least one sensor for detecting a pressure of air in the intake manifolds, said coolant temperature sensor, said air temperature sensor, and said air pressure sensor being connected to said control unit.

11. An apparatus according to claim 7, further comprising at least one warning light for indicating a misfire in at least one engine cylinder, said warning light being connected to said control unit.

12. An apparatus according to claim 7, further comprising at least one sensor for detecting a position of an engine throttle, said engine throttle sensor being connected to said control unit.

13. An apparatus according to claim 7, further comprising at least one sensor for detecting a temperature in the exhaust pipes, said exhaust pipe temperature sensor being connected to said control unit.

14. A car comprising an apparatus for detecting a misfire in one or more engine cylinders of an internal combustion engine, said apparatus comprising:

at least one sensor for detecting a pressure in an exhaust pipe;

at least one sensor for detecting a rotation of a crankshaft;

said sensors being connected to at least one control unit, said control unit comprising:

means for producing a converted signal by performing analogue-to-digital conversion of a signal from said sensor for detecting exhaust pipe pressure;

means for producing a sampled signal by sampling said converted signal, wherein a sampling frequency is proportional to a rotational speed of the crankshaft;

memory means for storing said sampled signal; and means for analyzing said sampled signal in the frequency domain by means of a Fourier transform, calculating a misfire index from said analysis, comparing said index with at least one threshold value, and identifying a misfire based on said comparison of said index with said at least one threshold value.

* * * * *